(12) United States Patent
Rivals et al.

(10) Patent No.: US 11,323,784 B2
(45) Date of Patent: *May 3, 2022

(54) TELEMETRIC DEVICES AND METHODS OF DYNAMIC TRANSMISSION FREQUENCY

(71) Applicant: SILICON CONTROLS PTY LTD, Macquarie Park (AU)

(72) Inventors: Julien Dominique Rivals, Zetland (AU); John Richard Haddy, Lane Cove West (AU)

(73) Assignee: Silicon Controls Pty Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/089,442

(22) Filed: Nov. 4, 2020

(65) Prior Publication Data

US 2021/0099775 A1 Apr. 1, 2021

Related U.S. Application Data

(63) Continuation of application No. 16/508,520, filed on Jul. 11, 2019, now Pat. No. 10,863,254.

(30) Foreign Application Priority Data

Jul. 12, 2018 (AU) .................. 2018205134

(51) Int. Cl.
*G08C 19/04* (2006.01)
*H04Q 9/02* (2006.01)

(52) U.S. Cl.
CPC ........... *H04Q 9/02* (2013.01); *H04Q 2209/40* (2013.01); *H04Q 2209/84* (2013.01); *H04Q 2209/883* (2013.01)

(58) Field of Classification Search
CPC .. H04Q 9/02; H04Q 2209/40; H04Q 2209/84; H04Q 2209/883; H04Q 9/00

(Continued)

(56) References Cited

U.S. PATENT DOCUMENTS 5,228,339 A 7/1993 Maresca et al.
2004/0090950 A1 5/2004 Lauber et al.

(Continued)

FOREIGN PATENT DOCUMENTS

IE S84011 B2 9/2005
WO 2018099641 A1 6/2018

*Primary Examiner* — Tanmay K Shah
(74) *Attorney, Agent, or Firm* — Rita C. Chipperson, Esq.; Chipperson Law Group, P.C.

(57) ABSTRACT

A method of operating a battery powered telemetric device configured with a processor, a sensor to measure data to indicate the contents or usage of a product within an asset generating sample data, data storage, at least one battery and a transmitter, includes keeping in the data storage at least one instance of previous data samples represented in a previously transmitted packet, awakening the telemetric device at variable time intervals programmed according to pre-determined user-defined characteristics so that the sensor provides sample data to the data storage to indicate the contents or usage of the product within the asset wherein the telemetric device is otherwise asleep to minimize battery drain, storing all the sample data since the transmission of the previously transmitted packet and the kept at least one instance of previous data samples represented in the previously transmitted packet in the data storage as all the stored sample data, transmitting a packet including representations of the contents or usage of the product within in the asset of all the stored sample data in a manner to limit the number of transmissions to as few as possible unless: the stored sample data indicates changes in the contents or usage of the product within the asset are equal to or exceed a predetermined change value; or there has been no change in the contents or usage of the product within the asset over a prolonged period of time.

18 Claims, 4 Drawing Sheets

(58) Field of Classification Search
USPC .................................................. 340/870.39
See application file for complete search history.

(56) References Cited

U.S. PATENT DOCUMENTS

| | | |
|---|---|---|
| 2005/0083197 A1 | 4/2005 | Glenn et al. |
| 2009/0303059 A1 | 12/2009 | Von Lintzgy et al. |
| 2010/0179897 A1 | 7/2010 | Gafford et al. |
| 2010/0315203 A1 | 12/2010 | Peden, II et al. |
| 2013/0154829 A1 | 6/2013 | Mostov |
| 2013/0181829 A1 | 7/2013 | Schnitz et al. |
| 2015/0276463 A1 | 10/2015 | Milne et al. |
| 2016/0209259 A1 | 7/2016 | Edwards |
| 2016/0221039 A1 | 8/2016 | Fuchs et al. |
| 2017/0227387 A1 | 8/2017 | Fenn et al. |
| 2018/0135285 A1 | 5/2018 | Canfield et al. |
| 2019/0073827 A1* | 3/2019 | Coronado ................ H04Q 9/00 |
| 2019/0249830 A1 | 8/2019 | Cho et al. |
| 2020/0021897 A1 | 1/2020 | Rivals et al. |

* cited by examiner

TELEMETRIC DEVICES AND METHODS OF DYNAMIC TRANSMISSION FREQUENCY

CROSS REFERENCE TO RELATED APPLICATION

This application is a continuation of U.S. patent application Ser. No. 16/508,520 filed Jul. 11, 2019, which claims priority to Australian Patent Application No. 2018205134 filed Jul. 12, 2018, which are incorporated by reference in their entirety.

FIELD

Disclosed are telemetric devices configured for dynamic transmission frequency and methods of dynamic transmission frequency.

BACKGROUND

An asset can be configured and utilized to contain products. An asset can be, for example, a tank, an enclosure or a meter. Assets can contain liquid, gas, solid and/or any type of product, for example, gas cylinders in a cage, or edible products in a refrigerator. Fuel, a liquid product, or other liquid or gas products are often stored for immediate use at a location. Accordingly, frequently assets are at outdoor locations worldwide. Therefore, assets frequently are subjected to environmental conditions, in particular, weather and events of every extreme.

With the advent of wireless networks such as cellular and IoT (Internet of Things) networks, devices including one or more sensors to monitor the product content level or usage of an asset and configured with telemetry for reporting sensor data, can be coupled to assets to report the asset's product contents level or usage data. Accordingly, a housed wireless telemetric sensor device which is fitted to an asset therefore can be subjected to the same conditions as any asset in any location, worldwide. A housed sensor device may sample the contents or product level or product usage of the asset and transmit sensor data, for example, to a remote location.

Assets can be located within a product distribution area. Asset maintenance and fulfillment planning may depend upon accurate data within tolerances being delivered by a sensor via telemetry to a remote server so that data can be reported to distributors of such contents or products and/or other interested parties or entities. Reliability of the device may dictate that electronic components and one or more batteries are in a sealed housing to avoid the effects of environmental conditions on the device. Therefore, it may not be possible to change the batteries of the device while maintaining its seal against environmental conditions. Whilst increased battery size and thus capacity can contribute to longer battery life, constraints of a device's optimum housing configuration may dictate that smaller batteries, such a AAA or AA size cells are utilized in a sealed housing. Replacement of a device because the batteries are drained should occur as infrequently as possible to avoid time and expense spent by replacement, any waste of electronic components and plastics, and any disruption of services or expense caused by the need for replacement.

SUMMARY

It is an object of the disclosed methods and devices to at least partially ameliorate problems described above, and others where possible.

According to a first aspect, the embodiments provide a method of a battery powered telemetric device configured with a processor, a sensor to measure data to indicate the contents or usage of a product within an asset generating sample data, data storage, at least one battery and a transmitter, comprising keeping in the data store at least one instance of previous data samples represented in a previously transmitted packet, awakening the telemetric device at a fixed predetermined time interval so that the sensor provides sample data to the data storage to indicate the contents or usage of the product within the asset wherein the telemetric device is otherwise asleep for the fixed predetermined time interval to minimize battery drain, storing all the sample data since the transmission of the previously transmitted packet and the kept at least one instance of previous data samples represented in the previously transmitted packet in the data storage as all the stored sample data, transmitting a packet including representations of the contents or usage of the product within in the asset of all the stored sample data in a manner to limit the number of transmissions to as few as possible unless: the stored sample data indicates changes in the contents or usage of the product within the asset are equal to or exceed a predetermined change value; or there has been no change in the contents or usage of the product within the asset over a prolonged period of time.

According to a second aspect, the embodiments provide a battery powered telemetric device configured with a processor, a sensor to measure data to indicate the contents or usage of a product within an asset generating sample data, data storage, at least one battery, and a transmitter, comprising the processor configured to keep in the data storage at least one instance of previous data samples represented in a previously transmitted packet, the processor configured to awaken the telemetric device at a fixed predetermined time interval so that the sensor provides sample data to the data storage to indicate the contents or usage of the product within the asset wherein the telemetric device is otherwise asleep for the fixed predetermined time interval to minimize battery drain, the processor configured to store all the sample data since the transmission of the previously transmitted packet and the kept at least one instance of previous data samples represented in the previously transmitted packet in the data storage as all the stored sample data, the transmitter configured to transmit a packet including representations in the contents or usage of the product within in the asset of all the stored sample data in a manner to limit the number of transmissions to as few as possible unless: the stored sample data indicates changes in the contents or usage of the product within the asset are equal to or exceed a predetermined change value; or there has been no change in the contents or usage of the product within the asset over a prolonged period of time.

According to a third aspect, the embodiments provide an asset monitoring device configured with a processor, a sensor to measure data to indicate the contents or usage of a product within an asset generating sample data, data storage, at least one battery, and a transmitter, comprising the processor configured to keep in the data storage at least one instance of previous data samples represented in a previously transmitted packet, the processor configured to awaken the telemetric device at a fixed predetermined time interval so that the sensor provides sample data to the data storage to indicate the contents or usage of the product within the asset wherein the telemetric device is otherwise asleep for the fixed predetermined time interval to minimize battery drain, the processor configured to store all the sample data in the data storage since the transmission of the previously transmitted packet and the kept at least one instance of previous data samples represented in the previously transmitted packet in the data storage as all the stored sample data, the transmitter configured to transmit a packet including representations in the contents or usage of the product within in the asset of all the stored sample data in a manner to limit the number of transmissions to as few as possible, wherein the representations are compressed to limit the battery power required for the transmission.

Further disclosed is a telemetric electronic device configured with at least a sensor, a processor, a transmitter and a battery. As discussed above, the life of one or more batteries is important to the life of a device where the one or more batteries are sealed inside the housing and cannot be replaced without destroying environmental protection seals. The presently disclosed devices and methods thereof may provide the opportunity for longer battery lives. It is also understood, where the one or more batteries are replaceable in a device, the presently disclosed telemetric device may also be utilized.

Disclosed is a telemetric electronic device configured with a processor including an interface between the telemetric electronic device and an asset, the asset configured to contain a contained product, a transmitter coupled to the processor, a sensor coupled to the processor, the sensor configured to provide sample data to indicate contents level or usage of the contained product, wherein the processor is configured to: specify a particular stored change threshold value; receive and store sample data received from the sensor, wherein the stored sample data comprises previous sample data, a representation of which was transmitted in a previous transmission, and recent sample data collected since the previous transmission; determine a corresponding change value wherein the corresponding change value, is the difference between at least one instance of the recent sample data and at least one instance of the previous sample data; compare the corresponding change value with the specified particular stored change threshold value to determine whether the corresponding change value is equal to or exceeds the specified particular stored change threshold value; and trigger the transmitter to transmit a representation of the at least one instance of the recent sample data when the corresponding change value is equal to or exceeds the specified particular stored change threshold value.

In one embodiment, the disclosed devices and methods translate recent sample data to indicate the level or usage of the contained product as a percentage value of contained product remaining within the asset. In another embodiment, the specified particular change threshold value is determined based upon historical indication data. In yet another embodiment, the specified particular change threshold value varies. In a further embodiment, at least one instance of the previous data sample represents a latest reported data. In another embodiment, when the processor generates for transmission a representation of at least one instance of recent sample data, the processor replaces the at least one instance of recent sample data with zero or a representation of zero when the corresponding change value indicates substantially no change from the at least one instance of the previous sample data. In still another embodiment, the processor generates for transmission a representation of at least one instance of recent sample data, the processor replaces one or more of the recent sample data with a corresponding change value. In another embodiment, the processor generates for transmission a representation of at least one instance of recent sample data, the processor replaces one or more of the recent sample data with a reference to a corresponding change value. In a further embodiment of the disclosed methods and devices, when the corresponding change value indicates substantially no change from the at least one instance of previous sample data over a predetermined time interval, the processor is configured to transmit at least one representation of recent sample data at a predetermined time interval since the last transmission.

Also disclosed is method of a telemetric electronic device configured with a processor, comprising an interface between the telemetric electronic device and an asset, the asset configured to contain a contained product, a transmitter coupled to the processor, a sensor coupled to the processor, the sensor configured to provide sample data to indicate contents level or usage of the contained product, the method including configuring the processor to specify a particular stored change threshold value; configuring the processor to: receive and store sample data received from the sensor, wherein stored sample data comprises previous sample data, a representation of which was transmitted in a previous transmission, and recent sample data collected since the previous transmission; determine a corresponding change value wherein the corresponding change value is the difference between at least one instance of the recent sample data and at least one instance of the previous sample data; compare the corresponding change value, with the specified particular stored change threshold value to determine whether the corresponding change value is equal to or exceeds the specified particular stored change threshold value; and trigger the transmitter to transmit a representation of at least one instance of recent sample data when the corresponding change value is equal to or exceeds the specified particular stored change threshold value.

The instant disclosure is provided to explain in an enabling fashion the best modes of making and using various embodiments in accordance with the present embodiments. The disclosure is further offered to enhance an understanding and appreciation for the embodiments, principles and advantages thereof, rather than to limit in any manner the scope of the claims. While the embodiments are illustrated and described here, it is clear that the scope is not so limited. Numerous modifications, changes, variations, substitutions, and equivalents will occur to those skilled in the art having the benefit of this disclosure without departing from the spirit and scope of the present embodiments as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present embodiments, discussion of such software and ICs, if any, is limited to the essentials with respect to the principles and concepts within the preferred embodiments.

DETAILED DESCRIPTION

Transmission of data by a device draws substantially upon a device's battery. In low-power wide area network radio (LPWAN) such as LoRa™, Sigfox™ and 3GPP cellular technology such as NB-IoT, the power draw for transmission is low enough so that typically a capacitor is not required to store power for a transmission of data, or a data burst. In a cellular device, a capacitor or similar energy storage component would probably be required to store power for the device to transmit data. In any event, the disclosed method of transmission of the disclosed device can be used for any device transmitting data in any network. At a location remote to the device, data transmitted by the device can be received at a remote location. The remote location can be a transmission node which can in turn direct the data, for example, to a remote server. In any transmission configuration based upon any transmission protocol, an asset monitoring device may be remote to server such that the server may receive transmissions from the device.

Figure 1:
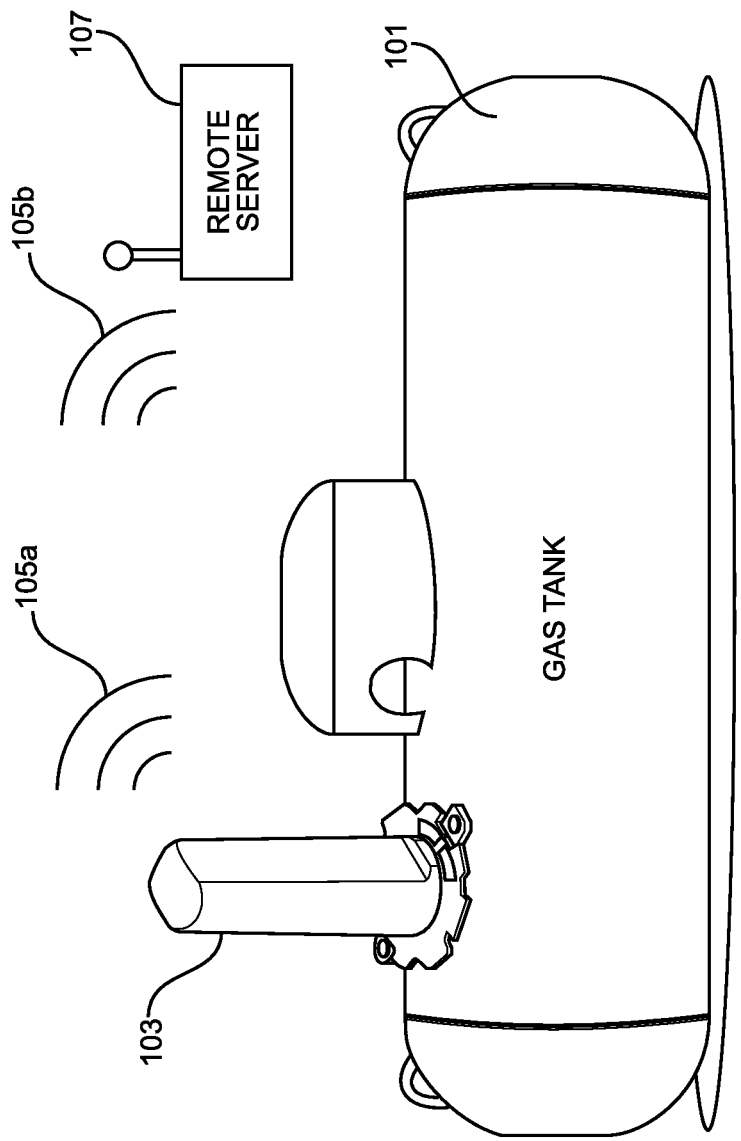
FIG. 1 depicts an asset fitted with a telemetric device in communication with a remote server.

FIG. 1 depicts an asset that is, in this example, an LPG tank 101 which may be a remote asset, such being remote from a transmission monitoring server. As previously discussed, an asset may contain any type of product and it is understood that the product may be liquid, solid, gas or any other type of product. A telemetric electronic device 103 includes an interface for attachment, removably or fixed or otherwise, to an asset. Depending upon the type of asset and possibly an already existing sensor arrangement (such as a magnetically enabled float gauge), the manner in which the telemetric electronic device 103 interfaces with the asset can vary. The telemetric device 103, may be housed in a single housing or a plurality of housings, and/or for example, may be incorporated into the asset.

The vessel, tank or asset described herein is a pressure vessel in the form of a LPG bulk storage tank of FIG. 1, but the vessel may alternatively be any of a cylinder or a tank for any suitable fluid, solids, gas or any type of product, examples of which include liquefied gas fuel, liquefied ammonia, cryogenic liquids including liquefied natural gas and liquefied permanent gases, water, solutions, liquid chemicals, and refined petroleum products including petrol, kerosene, and fuel oil. Furthermore, the tank can be more generally referred to as an asset, wherein the asset can be, for example, any fuel handling, storage systems or any commodities distribution enclosure. While a magnetically enabled float gauge fuel-level sensor system is typically used in an LPG or oil tank, it is understood that a product-level sensing device can be enabled by any type of technology, for example, ultra-sound/ultrasonic, optical, pressure, ammeters, voltmeters, weight, laser, microwave and any other type of sensor system and any product-level or usage detection is within the scope of this discussion.

In another embodiment, the telemetric electronic device 103 may be incorporated into the asset as a part of the asset, in any suitable manner.

The telemetric electronic device 103 is configured with a transmitter or transceiver of any suitable type (see FIG. 2), which generates one or more signals 105a and 105b which can be received by a remote server 107 which receives transmissions from the telemetric electronic device 103, which may also be referred to as an asset monitoring device, or a remote asset monitoring device, such being remote to the server 107. At the device 103, the remote server 107 or at a different computing device such as a mobile device, raw data can be processed. The processed data, as described above, can be utilized, for example, for product distribution purposes.

Still referring to FIG. 1, at least one sensor 115 can be configured to provide sample data to indicate a level or usage of the product contained in an asset, such as tank 101. The sensor may provide data to indicate a level of the product contained in the asset at a specified time interval or a usage rate at the specified time. For example, the device may be "asleep" for periods of time to minimize battery drain, for example for thirty (30) minute intervals. Therefore, the device 103 including the sensor 115 may be "awakened" for the purpose of the sensor providing sample data to indicate a level or usage of the contained product. That is, the sensor 115 can be polled by the processor 113 for sensor data wherein the processor may include a clock, RTC or timer or the time keeping component may be a separate component from the processor. The device may be awakened for other purposes at the same time or different times as well.

Figure 2:
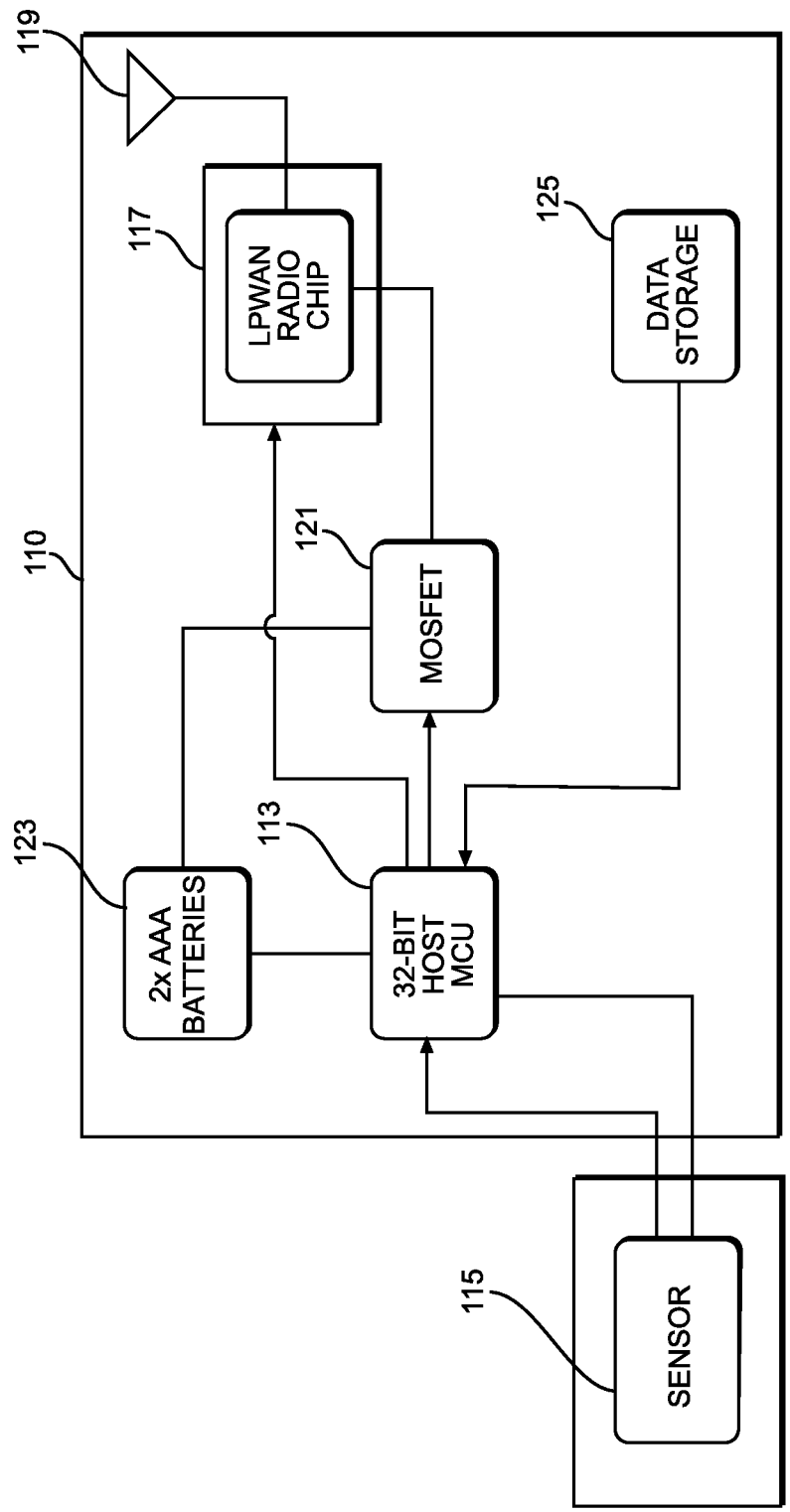
FIG. 2 depicts a block circuit diagram 110 showing circuit components that may be housed in single housing or more than one housing.

FIG. 2 depicts a block circuit diagram 110 showing circuit components that may be housed in single housing or more than one housing. It is also understood that the depiction of the disclosed telemetric device 103 is an example, and that the device 103 can take any form, for example, it can be comprised of two or more housings, not just a single housing as shown. Connecting lines with arrows are information conduits and connecting lines without arrows are power conduits. The electronics can include at least one printed circuit board assembly (PCBA) or other means for carrying components.

The electronics can include a plurality of electrical components. The plurality of electrical components can include at least one of a processor 113 in the form of a logic device of any suitable type, in this embodiment a host microcontroller unit, a sensor 115 of any kind suitable for the purpose of providing sample data to indicate a level or usage of the contained product, and a radio 117 in the form of a radio transmitter or transceiver of any suitable type. A radio can comprise at least one of a short-range network interface and/or a medium range radio network interface and/or a long range radio network interface, an antenna 119, and a power switch in the form of a MOSFET 121 and an electrical power source in the form of at least one battery 123 of any suitable type. The MOSFET 121 and the processor 113 cooperate to switch on and/or switch off the power to the radio 117 to transmit data. Any other suitable form of switch, for example a relay, may be used instead. A data storage 125 component may store sensor data and/or data storage may be available on the processor 113. In an alternative embodiment, the electrical power source can include an energy harvesting system that harvests mechanical energy (e.g. vibrations), electromagnetic energy (e.g. radio waves, light), or heat. For example, the energy harvesting system may comprise a solar cell, or piezo-electric generator.

Medium-to-long range wireless links which enable transmission to centralized data centres 107, for example, can use either private or commercial radio base stations. In one embodiment, the radio network interface can include a low-power wide area network (LPWAN) interface. An LPWAN is a type of wireless communications network for medium to long range communications at bit rates which are generally, but not necessarily, low, and has low power consumption when compared to cellular communication technologies for voice and high bandwidth data services. Examples of LPWAN include but are not limited to LoRa™, Sigfox™ and 3GPP cellular technology such as NB-IoT. The LPWAN radio integrated circuit may be within an LPWAN radio module. The range achieved LPWAN depends on many factors, including the presence of obstacles in the transmission path, but ranges of more than 5 km are common, for example approximately 5-20 km. Alternative embodiments may have a radio 117 including another type of medium range radio network interface or long-range radio network interface, for example a cellular radio network interface (examples of which include but are not limited to GSM, CDMA, and LTE cellular radio network interfaces), IEEE 802.11 interface ("Wi-Fi") and a satellite communications interface. As mentioned, in another embodiment, narrowband IoT can provide a substantial range.

Figure 3:
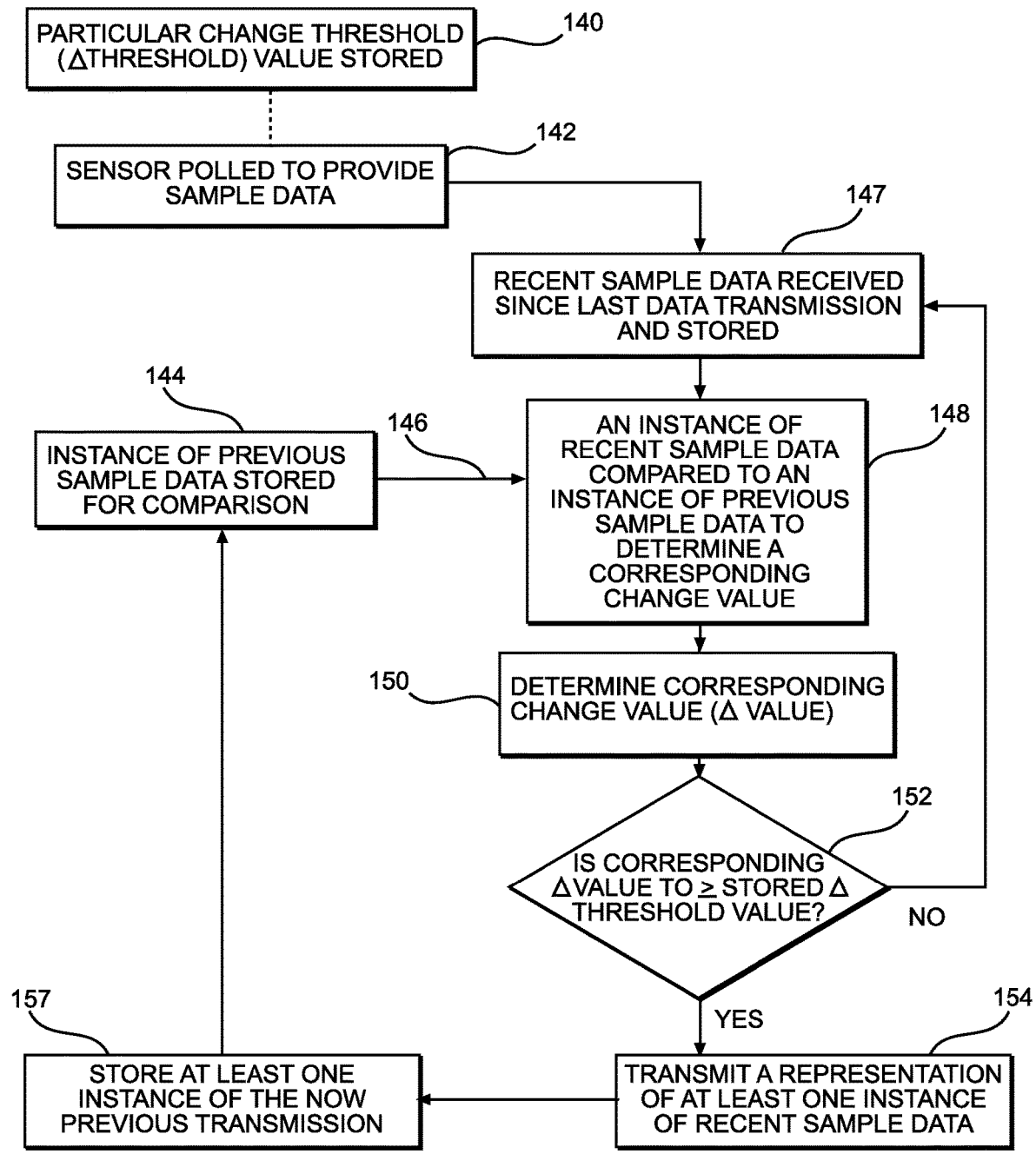
FIG. 3 depicts a flow chart of the disclosed method of the disclosed telemetric device.

FIG. 3 depicts a flow chart of the disclosed methods of the disclosed telemetric electronic device 103. One or more specific particular stored change threshold values may be stored at step 140 by storage means. As mentioned, the processor 113 (of FIG. 2) may include data storage capability and/or separate data storage 125 as depicted. A value for a particular stored change threshold value may be stored in any suitable manner for use in the disclosed process of the disclosed telemetric electronic device 103. The specific particular stored change threshold value may be factory installed, or custom installed, for example, by the distribution company, the installer or the seller of the telemetric device 103 or configured by a customer or user. The specific particular stored change threshold value is used to compare at least one previous sample data, a representation of which was transmitted in a previous transmission, and recent sample data which was collected since the previous transmission.

In a routine situation, a previous data transmission would have occurred so that at least a representation of the last value of a previous transmission could be stored. The last value of the previous transmission most likely is a representation of the lowest level or most recent usage of the product contained in the asset. Except possibly at a set up stage of the process or when the asset is refilled or when there is an extraordinary event, during routine use of the disclosed process of the disclosed telemetric device 103, sample data that is currently received from the sensor is compared to at least one previous sample data, a representation of which was transmitted in a previous transmission that would have been stored at step 157 of FIG. 3. To determine the step of keeping in the data store at least one instance of previous data samples, represented in the previously transmitted packet, depending upon the data structure of the data storage of the device, the data storage can be cleared, overwritten or otherwise and in any manner keep in the data store at least one instance of previous data samples. The keeping of at least one previously transmitted data can be affected by for example, marking the data of a previous sample. In IoT systems, where there is typically no confirmation of successful transmission of previous data, keeping some or all data of previously transmitted packets may not add to the reliability of the data transmissions. An IoT system may expect transmissions, and if none or fewer transmissions than expected are received, a notification may be sent to alert that there may be a problem with the device. Alternatively, in cellular system, a confirmation of a received transmission may be sent where if received, storing of previously sent data is not necessarily needed, except for the comparison value. How the stored data is managed is dependent on the hardware and transmission protocols.

The manner in which the one or more specific particular stored change threshold values is determined may depend upon the circumstances and/or particular application of the disclosed process of the disclosed telemetric electronic device 103. In the examples given in the present disclosure, the value of −1% is used. In practice, the specific particular change threshold value may be determined based upon historical indication data. For example, in an LPG tank used for personal home use, it may have been found that the level of fuel in the tank rarely changes more than 1% per day. In that case, the particular stored change threshold value may be equivalent to −1%.

In an industrial use, for example, it may be found based upon historical indication data that the level in the tank changes around 3%-5% per day. Also, it may be important that when the tank level reaches a certain level, say 30% of its capacity, that the remote server provides relevant data, for example, to a distributor to make deliveries more efficiently. In that case, for example, the specific particular stored change threshold value may vary from 1%, to 2% and to 3% depending upon the level at a given time. Any suitable specific particular stored change threshold value, static, variable and/or dynamic is within the scope of this discussion. A dynamic specific particular stored change threshold value could be affected by ambient variables such as temperature or humidity, and/or may be programmed to respond to user defined characteristics.

In any case, one or more particular stored change threshold values is stored so that it can be used when an instance of a previous sample data is compared to an instance of recent sample data to determine if the difference between them is the same as or exceeds the particular stored change threshold value.

Again, referring to FIG. 3, it is assumed in this figure that previous sample data was transmitted in a previous transmission. Depending upon the ability to store data, either all or part of the previous sample data transmitted may be stored. In one embodiment, the latest reported data is stored to minimize the amount of data stored. As mentioned above, the latest reported data in many situations may represent the lowest level of product contained in the asset at that time. However, in the event of a refill, the latest reported data may be higher that the lowest level of the product contained in the asset. For whatever reason, it may be beneficial to use a different value than the latest reported data to compare against a current sample data. The directional arrow 146 is meant to depict the comparison step.

In the example of FIG. 3, the sensor is polled to provide recent sample data at step 142. As mentioned, the sensor can be any type of sensor and may be dependent upon the asset. For example, a domestic use LPG tank usually utilizes a float gauge. The quantity of liquefied gas fuel within a pressure vessel may be determined using a liquid-level gauge in the form of a float-level gauge. For example, manufacturers of float-level gauges include ROCHESTER, TAYLOR and COTRAKO brand float-level gauges. The float-level gauge includes a float connected to a stem via a movable joint, and a head from which the stem depends. The level float-gauge penetrates a pressure vessel wall and the head is externally attached thereto with bolts that pass-through bolt passageways to a flange or other suitable mount that is integrated with the pressure vessel, for example by welds or screws.

The float follows the interface between the liquefied gas fuel and the vapour thereof. A magnet located at the head is operationally coupled to the float. Movement of the float is transmitted to the magnet via a gear system at the joint. Vertical movement of the float is transformed to a rotation of the magnet at the head, and consequently a rotation of the magnet's magnetic field. The magnet is mounted to rotate around the stem axis. Generally, the magnetic field may be followed by a user-visible external needle, the orientation of which may indicate the height of the float and the interface that the float follows.

According to FIG. 3, the sensor is polled to provide recent samples data at step 142. The processor 113 may poll the magnetic angle direction of the float gauge sensor at any suitable time interval, for example at 30 minutes. The time interval may be static, variable and or dynamic and may be at least one of continually, periodically, randomly, at fixed intervals, at repeating intervals, regularly, continuously and progressively. While thirty minutes has been disclosed, any suitable time interval determined, for example, empirically, is within the scope of this discussion.

Accordingly, the recent sample data, that is sample data collected since the last transmission, may be received and stored at step 147. The last received recent sample data, as discussed above, is compared with at least one instance of previous sample data 144 at step 148. The difference between the recent sample data and the at least one instance of previous sample data is evaluated at step 150 to determine a corresponding change value.

It should be noted here that depending upon the type of sensor used, the format of the stored data may be raw data from the sensor. In the case of the float gauge sensor described above, the raw data value that is received by the sensor represents is a difference of the magnetic field caused by the float receding as the product stored in the asset is used. In one embodiment, the raw data of the magnetic angle reading is stored and compared against an angular reading of an instance of previous sample data stored for comparison at step 144. Accordingly, the data storage 125 depicted in FIG. 2 may store raw data, and the comparisons may be between raw data in whatever format is provided by the sensor. The raw data may be transmitted in the transmissions, and/or compressed as will be discussed below, for interpretation at the remote server 107 depicted in FIG. 1 or device such as a mobile device. Alternatively, interpretation of raw data may take place by the device 103.

Figure 4:
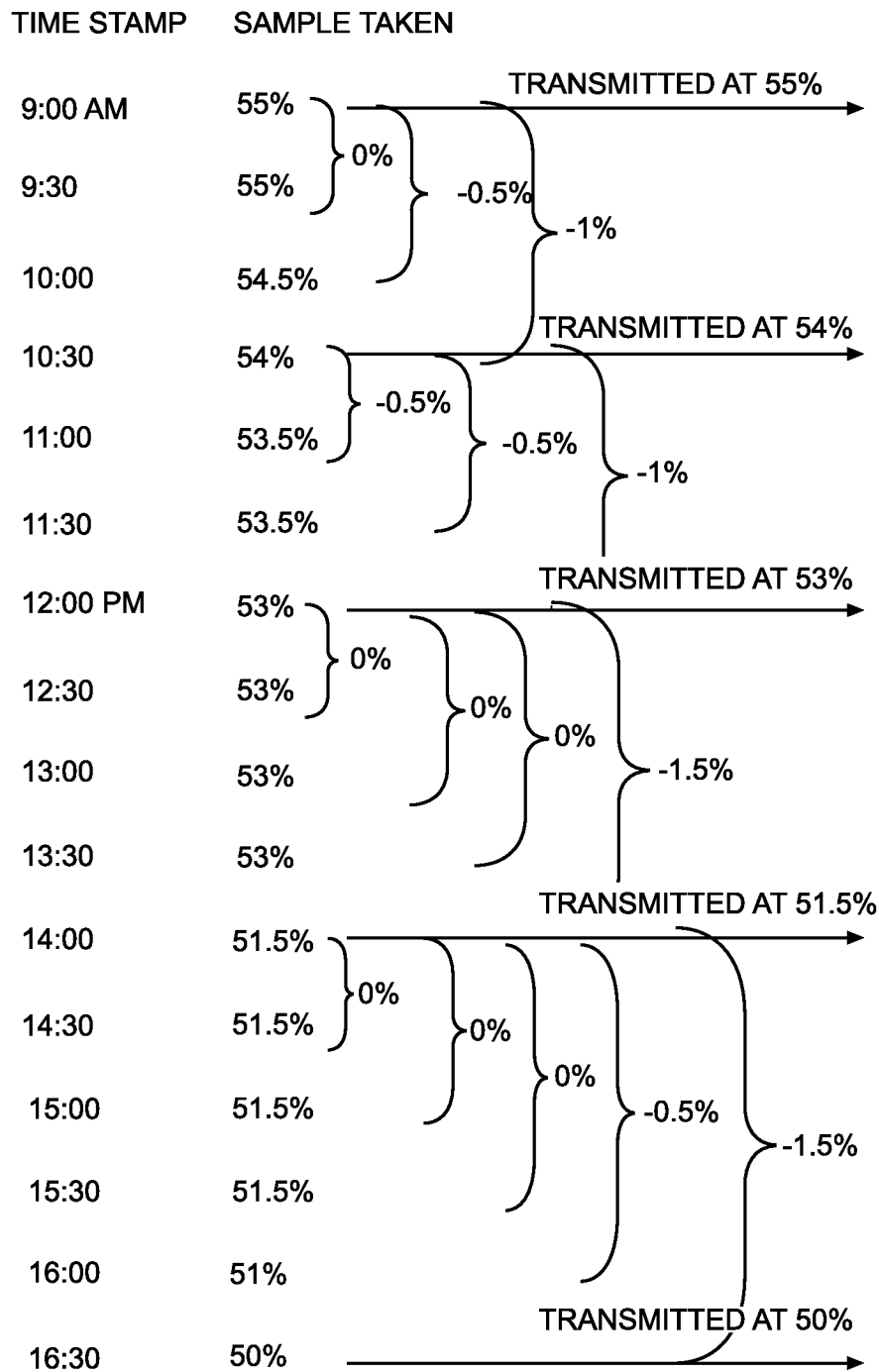
FIG. 4 depicts time stamped sample data capture and transmission times.

Referring now to FIG. 4, as mentioned above, the particular stored change threshold value can be any suitable value and can be determined based upon historical indication data. The particular stored change threshold value may be for example 1% or −1%. In the example of FIG. 4, a "time stamp" is shown in the left-hand column. At 9:00 AM, the sensor reported data as interpreted was 55%, and at 9:00 AM, a representation of that value was transmitted as previous sample data. By virtue of the example, the time stamp starts at 9:00 AM when a representation of at least one recent sample data is shown as having been transmitted and stored at step 157 of FIG. 3.

Still referring to FIG. 4, up to 9:30, there is 0% usage. That is, the sensor reported value between 9:00 AM and 9:30 AM when compared, there is no difference between the previous sample data representative of 55% and the recent sample data also representative of 55%, as shown in the second to the left column, "sample taken". The recent sample data taken at 9:30 AM is stored but it is not transmitted unless some other circumstances dictate that it is transmitted.

At 10:00 AM, the sensor reported recent sample data is 54.5% which provides a difference of −0.5% in the previous sample data representative of 55% transmitted at 9:00 AM. However, the difference between the previous sample data representative of 55% transmitted at 9:00 AM and the recent sample data representative of 54.5% of −0.5% which is less than the specified particular stored change threshold value of −1% so that recent sample data is stored and not transmitted yet. It is understood that the notion of equal to or more than is with regard to an absolute value of the specified particular stored change threshold value, as it is noted that the 1% specified particular stored change threshold value when applied is actually −1%.

At 10:30 AM, the sensor reported a representation of recent sample data of 54% which provides a difference of −1%. Therefore, the difference between the previous sample data representative of 55% transmitted at 9:00 AM and the recent sample data representative of 54% at 10:30 AM is −1% which is equal to or more than the absolute value of the specified particular stored change threshold value of −1%. Therefore, a representation of at least one of the recent sample data is transmitted. In practice, a representation of all of the recent sample data, in its raw data state, or in an interpreted state, may be transmitted.

Following the transmission at 10:30 AM where the last sample from the last transmission at 10:30 AM was a representation of 54%, the same process as discussed above can take place. Between 10:30 AM and 12:00 PM, every 30 minutes, recent sample data is stored. At 12:00 PM the value of the last sample transmitted at 10:30 AM is compared against the sample taken at 12:00 PM and there it is found that there is a −1% difference between those values. The interim samples taken at 11:00 and 11:30 did not reach or exceed the absolute value of 1%, or −1% which is the specified particular stored threshold value. Therefore, at 12:00 PM, the recent sample data taken since the last transmission is transmitted.

Following the transmission at 12:00 PM, representations of samples taken at 12:30, 13:00, 13:30 and 14:00, are transmitted in their raw state or in an interpreted state, as well as a representation of 53%, which is the last value transmitted at 12:00 PM.

Now again, referring to FIG. 3, the query step 152 referenced in the last example would have found that the corresponding change value is equal to or more than the particular stored change threshold value and therefore the answer to the query would have been "yes." In that case, there is a transmission of recent sample data at step 154 in a raw or interpreted state. Also, preferably, the last value of the transmission of the recent sample data is stored at step 157 so that it may be used in the comparison step in the next iteration of the process at step 144.

The last instance of the recent sample data that was transmitted will in most cases represent the lowest level or most recent usage of product contained in the asset. The result is that the transmissions are limited to when there has been enough of a change to warrant a transmission, except of course, if there is some type of event where this disclosed process is interrupted. By transmitting representations of changes in the level or usage of product contained in the asset to a time when it is relevant according to, for example based upon historical indication data, the disclosed process of the disclosed telemetric device can limit the number of transmissions to as few as possible, and therefore, the energy contained in the battery is conserved. The manner in which the transmissions are limited in number to as few as possible includes, for example, optimizing packet fullness. Depending upon the protocol of the transmission system, if not otherwise transmitted because the stored sample data indicates changes in the contents or usage of the product within the asset are equal to or exceed a predetermined change value or there has been no change in the contents or usage of the product within the asset over a prolonged period of timer, the packet is preferably full. The data of a packet can be in any suitable state as described here, raw data, adjusted data, change data and/or compressed.

In an alternative embodiment, while recent sample data is being collected, each current value may be compared against the most recent sample data at each interval, instead of being compared against an instance of previous sample data at each interval. In yet another embodiment, recent sample data may be compared across multiple samples (possibly consecutive). In one example, a fill alarm may be a particular percentage, for example, 5% across three consecutive 30-minute samples, whereas an excess usage alarm may be −2% across two consecutive 30-minute sample. Accordingly, the corresponding change values could be added together to determine if and when their sum reaches or exceeds the specific particular stored change threshold value. The outcome of a different process may be the same or similar as the process described above.

A variable specific particular stored change value (stored Δ in FIG. 3) may take into account various monitoring times and conditions, for example, when the contained product is close to becoming depleted. In that case, for example, the particular stored change value may be 0.5%, for example, when the level of the contained product, for example, is 30%. For an asset that is used infrequently, or for a situation in which the product contained therein may run out as a matter of course, for example with a changeover valve switching between assets, the value of the particular stored change value can be higher, for example, equal to greater than 3%. While various percentages have been disclosed, any specified particular stored change value in the level or usage of the contained product, static, variable and/or dynamic is within the scope of this discussion.

The value of the particular stored change value (stored Δ) can influence the frequency of the transmissions of data. Other factors may contribute to the actual transmission frequency. If the specific particular stored change value is lower, the frequency of transmissions will be higher. If the particular stored change value is higher, the frequency of transmissions will be lower. To reduce drain on the one or more batteries, it may be desirable to maintain a higher particular stored change value so that there will be fewer transmissions.

Again, referring to FIG. 3, prior to the transmission of the recent sample data at step 154, the data can be configured for transmission with data compression. By compressing the data from, for example, 5 bytes to 2 bytes, the drain on the battery can be reduced since transmission of less data requires less power. For example, the data collected in the last portion of FIG. 4 between 14:00 PM and 16:30 PM may have occurred in the following manner.

1. Assume the device last reported a tank level of 51.5% was transmitted at 14.00 PM.
2. It is now 14:30 PM, the device wakes-up, samples and stores the level, which is still 51.5%.
Because the difference between the last reported level (51.5%) and the current level (51.5%) is <1%, no transmission is attempted.
The devices goes back to sleep.
3. The same tasks occur at 15:00 PM with no difference between the last reported level of 51.5% and the current level of 51.5%
4. The same thing occurs at 15:30 PM.
5. It is now 16:00 PM. The device wakes-up, samples and stores the level, which is 51%. The difference is −0.5% which is ←1% in magnitude. There is no transmission.
6. It is now 16:30 PM, the device wakes-up, samples and stores the level, which is 50%. Because the difference between the last reported level (51.5%) and the current level (50%) is ≥1%, the device attempts and/or completes a transmission to report the 5 stored samples. The devices goes back to sleep.

Delta (Δ) Samples Protocol

At step #6 from above, the device has 5 samples plus an instance of previous sample data stored for comparison, stored in its memory 125:

| Timestamp | Tank level |
|---|---|
| 14:00PM<br>From previous data samples | 51.5% |
| 14:30PM | 51.5% |
| 15:00PM | 51.5% |
| 15:30PM | 51.5% |
| 16:00PM | 51% |
| 16:30PM | 50% |

Instead of building a data packet containing the 5 whole levels (requiring at least 5 bytes of data):

| 51.5% | 51.5% | 51.5% | 51.0% | 50% |
|---|---|---|---|---|

The firmware of the processor 113 can build a data packet containing an initial value plus 4 delta tank contents from the previous sample (requiring 2 bytes of data):

| 51.5% | 0% | 0% | −0.5% | −1% |
|---|---|---|---|---|

Accordingly, when the transmitter is triggered to transmit data, the data may be compressed. The data can be in the form of raw data or interpreted data. In this example, for illustrative purposes, the data is described as percentages. In one embodiment, the first value of the recent sample data since the last transmission may be transmitted uncompressed. For example, the first value of the recent sample data in the above example is 51.5%. If there has been no change in the recent sample data after the first recent sample data since the previous transmission, the processor may replace one or more stored sample data that indicates substantially no change in the level of the contained liquid with for example, a single bit such as one or more zero values, or any such value that represents "change". A single bit value such as zero or "1" can indicate "no change". For example, any value that is defined to indicate "no change" such as a single bit may be better than two or more bits, but any alternative encoding methods is included within this description. In the example above, the second and third values of the recent sample data are the same as the first value of the recent sample data, 51.5%. Therefore, those values may be replaced by zeros in the data compression since there was no change in the recent sample data. On the other hand, when there is a significant or substantial change in recent sample data from the previous transmission, the data may be compressed to indicate the change in the percentage between two recent data sample values. For example, as shown above, the fourth recent sample data was 51% which is 0.5% difference from the first sample data. The corresponding change value was therefore 0.5%. Then the fifth recent sample data was 50% so the corresponding change value was 1.5%, while 50% which was 1% from the fourth recent sample data. While for illustrative purposes, here the data is described as a negative number, the data can be transmitted as in terms of magnitude. In this manner, the corresponding change value itself may not be transmitted, but a reference to the corresponding change value may be transmitted because the first change value sent was 0.5% and the second change value sent was 1.0% so the sum of these two change values is 1.5% which is the corresponding change value for the fifth recent sample data. In this embodiment, the data is compressed to represent the change from one recent sample data to another recent sample data. In this way, there can be less data to transmit reducing the drain on the battery for transmission while the remote server which may be interpreting the data, can use the first value, here 51.5% as a reference value to determine the actual value of the other values transmitted in the data packet.

In the event of a zero change value (0%) over a prolonged period of time, for example, 24 hours, the device may compress and transmit the stored data in a similar manner as described above. For example, if recent data samples are stored every 30 minutes over 24 hours with no change, a transmission would let the remote server know that the device is still operating. As an example, referring to sample data transmitted at 16:30 PM of 50%, a packet could contain the first recent data sample value and a plurality of zeros. The number of zeros sent may be optimized to minimize the amount of energy required to provide relevant data of the contents of product in the container. If there is zero usage over several days or more, the last sample data value of the previous transmission, 50%, may be transmitted for a reference. Any other identifying data, for example, a date, may be transmitted in a packet along with the values, to provide context for the transmission.

In the above example, where data was sampled over 24 hours at 30-minute intervals, and corresponding change value was consistently zero, the disclosed telemetric device may dynamically alter the time to poll the sensor, for example to hourly until there is a change, at which time, it may return to polling the sensor at 30-minute intervals. In this way, power of the battery is conserved.

The disclosed methods and devices for reducing transmission volume of data may influence the life of the one or more batteries of a telemetric electronic device. In particular, devices that are subjected to weather conditions are typically sealed against weather conditions. The presently disclosed devices and methods thereof may provide the opportunity for longer battery lives to avoid waste in disposing of the products, as well as may provide data to one or more remote servers or remoted devices in a manner which allows distributors and users to determine product usage more reliably.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method of operating a battery powered telemetric device configured with a processor, a sensor to measure data to indicate the contents or usage of a product within an asset generating sample data, data storage, at least one battery and a transmitter, comprising;
    keeping in the data storage at least one instance of previous data samples represented in a previously transmitted packet;
    awakening the telemetric device at variable time intervals programmed according to pre-determined user-defined characteristics so that the sensor provides sample data to the data storage to indicate the contents or usage of the product within the asset wherein the telemetric device is otherwise asleep to minimize battery drain;
    storing all the sample data since the transmission of the previously transmitted packet and the kept at least one instance of previous data samples represented in the previously transmitted packet in the data storage as all the stored sample data;
    transmitting a packet including representations of the contents or usage of the product within in the asset of all the stored sample data in a manner to limit the number of transmissions to as few as possible unless:
    the stored sample data indicates changes in the contents or usage of the product within the asset are equal to or exceed a predetermined change value; or
    there has been no change in the contents or usage of the product within the asset over a prolonged period of time.

2. The method as claimed in claim 1 wherein at least some of the representations of the contents or usage of the product within the asset are compressed.

3. The method as claimed in claim 1, wherein when the processor generates for transmission the representation of the at least one instance of stored sample data, the processor replaces the at least one instance of the stored sample data with a compressed representation value when the stored sample data indicates no change in the contents or usage of the product from previously stored sample data.

4. The method as claimed in claim 1, wherein when the processor generates for transmission the representation of the at least one instance of the stored sample data, the processor replaces one or more of the stored sample data with a corresponding change value or a reference to a corresponding change value.

5. The method as claimed in claim 1 wherein the representations of the contents or usage of the product within the asset of the product transmitted in a packet includes a representation of the last sample data of the previously transmitted packet.

6. The method as claimed in claim 1 wherein variable time intervals programmed according to pre-determined user-defined characteristics comprise at least one of an accounting for the contents or usage of the product within the asset, an ambient condition and an event.

7. A battery powered telemetric device configured with a processor, a sensor to measure data to indicate the contents or usage of a product within an asset generating sample data, data storage, at least one battery, and a transmitter, comprising:

the processor configured to keep in the data storage at least one instance of previous data samples represented in a previously transmitted packet;

the processor configured to awaken the telemetric device at variable time intervals programmed according to pre-determined user-defined characteristics so that the sensor provides sample data to the data storage to indicate the contents or usage of the product within the asset wherein the telemetric device is otherwise asleep for the fixed predetermined time interval to minimize battery drain;

the processor configured to store all the sample data since the transmission of the previously transmitted packet and the kept at least one instance of previous data samples represented in the previously transmitted packet in the data storage as all the stored sample data;

the transmitter configured to transmit a packet including representations in the contents or usage of the product within in the asset of all the stored sample data in a manner to limit the number of transmissions to as few as possible unless:

the stored sample data indicates changes in the contents or usage of the product within the asset are equal to or exceed a predetermined change value; or there has been no change in the contents or usage of the product within the asset over a prolonged period of time.

8. The battery powered telemetric device as claimed in claim 7 wherein at least some of the representations in the contents or usage of the product within the asset are compressed upon transmission.

9. The battery powered telemetric device as claimed in claim 7, wherein when the processor generates for transmission the representation of the at least one instance of stored sample data, the processor replaces the at least one instance of the stored sample data with a compressed representation value when the stored sample data indicates no change in the content or usage of the product from previously stored sample data.

10. The battery powered telemetric device as claimed in claim 7, wherein when the processor generates for transmission the representation of the at least one instance of the stored sample data, the processor replaces one or more of the stored sample data with a corresponding change value or a reference to a corresponding change value.

11. The battery powered telemetric device as claimed in claim 7 wherein the representations in the contents or usage of the product within the asset of the product which are transmitted in a packet include a representation of the last sample data of the previously transmitted packet.

12. The battery powered telemetric device claimed in claim 7 wherein variable time intervals programmed according to pre-determined user-defined characteristics comprise at least one of an accounting for the contents or usage of the product within the asset, an ambient condition and an event.

13. An asset monitoring device configured with a processor, a sensor to measure data to indicate the contents or usage of a product within an asset generating sample data, data storage, at least one battery, and a transmitter, comprising:

the processor configured to keep in the data storage at least one instance of previous data samples represented in a previously transmitted packet;

the processor configured to awaken the telemetric device at variable time intervals programmed according to pre-determined user-defined characteristics so that the sensor provides sample data to the data storage to indicate the contents or usage of the product within the asset wherein the telemetric device is otherwise asleep for the fixed predetermined time interval to minimize battery drain;

the processor configured to store all the sample data in the data storage since the transmission of the previously transmitted packet and the kept at least one instance of previous data samples represented in the previously transmitted packet in the data storage as all the stored sample data; and the transmitter configured to transmit a packet including representations in the contents or usage of the product within in the asset of all the stored sample data in a manner to limit the number of transmissions to as few as possible, wherein the representations are compressed to limit the battery power required for the transmission.

14. The asset monitoring device as claimed in claim 13 wherein the transmitter is configured to transmit a packet including representations of the contents or usage of the product in the asset of all the stored sample data in a manner to limit the number of transmissions to as few as possible unless: the stored sample data indicates changes in the content or usage of the product within the asset are equal to or exceed a predetermined change value; or there has been no change in the content or usage of the product within the asset over a prolonged period of time.

15. The asset monitoring device as claimed in claim 13, wherein when the processor generates for transmission the representation of the at least one instance of stored sample data, the processor replaces the at least one instance of the stored sample data with a compressed representation value when the stored sample data indicates no change in the content or usage of the product from previously stored sample data.

16. The asset monitoring device as claimed in claim 13, wherein when the processor generates for transmission the representation of the at least one instance of the stored sample data, the processor replaces one or more of the stored sample data with a corresponding change value or a reference to a corresponding change value.

17. The asset monitoring device as claimed in claim 13 wherein the representations of the contents or usage of the product within the asset transmitted in a packet includes a representation of the last sample data of the previously transmitted packet.

18. The asset monitoring device as claimed in claim 13 wherein variable time intervals programmed according to pre-determined user-defined characteristics comprise at least one of an accounting for the contents or usage of the product within the asset, an ambient condition and an event.

* * * * *